United States Patent [19]

Sharma

[11] Patent Number: 5,218,032
[45] Date of Patent: Jun. 8, 1993

[54] PROCESS FOR PREPARING BLENDS OF POLYESTERS AND ACRYLIC POLYMERS

[75] Inventor: Mahendra K. Sharma, Kingsport, Tenn.

[73] Assignee: Eastman Kodak Company, Rochester, N.Y.

[21] Appl. No.: 638,912

[22] Filed: Jan. 9, 1991

[51] Int. Cl.$^5$ ............................................. C08K 5/05
[52] U.S. Cl. .................................. 524/379; 524/388; 524/513
[58] Field of Search .................. 524/513, 379, 388

[56] References Cited

U.S. PATENT DOCUMENTS

| | | | |
|---|---|---|---|
| 3,546,008 | 12/1970 | Shields | 117/138.8 |
| 3,734,874 | 5/1973 | Kibler et al. | 260/29.2 |
| 3,779,993 | 12/1973 | Kibler et al. | 260/75 |
| 4,335,220 | 6/1982 | Coney | 523/414 |
| 4,340,519 | 7/1982 | Kotera et al. | 523/414 |
| 4,368,287 | 1/1983 | Ishikura et al. | 524/513 |
| 4,395,500 | 7/1983 | Löhr et al. | 523/221 |
| 4,623,680 | 11/1986 | Azarnia et al. | 523/412 |
| 4,681,815 | 7/1987 | Rutkiewic et al. | 524/513 X |
| 4,704,309 | 11/1987 | Coney et al. | 427/258 |
| 4,725,500 | 2/1988 | Yanai | 524/513 X |
| 4,738,785 | 4/1988 | Langston et al. | 210/738 |
| 4,742,109 | 5/1988 | Takahashi et al. | 524/513 X |
| 4,847,316 | 7/1989 | Schick et al. | 524/88 |
| 4,883,714 | 11/1989 | Stockl et al. | 428/412 |
| 4,921,899 | 5/1990 | Phan et al. | 524/513 |
| 4,939,233 | 7/1990 | Jenkins | 528/272 |
| 4,946,932 | 8/1990 | Jenkins | 528/272 |
| 4,996,252 | 2/1991 | Phan et al. | 524/513 X |
| 5,039,339 | 8/1991 | Phan et al. | 524/513 X |
| 5,075,364 | 12/1991 | Phan et al. | 524/513 X |

FOREIGN PATENT DOCUMENTS 0356341 2/1990 European Pat. Off. .
2276340 1/1976 France .

*Primary Examiner*—Joseph L. Schofer
*Assistant Examiner*—J. M. Reddick
*Attorney, Agent, or Firm*—Betty J. James; William P. Heath, Jr.

[57] ABSTRACT

Disclosed is a process for preparing aqueous blends of compatible polyesters and acrylic polymers that avoids the need for surfactants. The polyesters contain at least 12 mol % of a sulfomonomer. The aqueous blends are useful in coatings and ink applications.

20 Claims, No Drawings

PROCESS FOR PREPARING BLENDS OF POLYESTERS AND ACRYLIC POLYMERS

FIELD OF INVENTION

The present invention concerns a process for preparing aqueous blends of polyesters and acrylic polymers that avoids the need for surfactants.

BACKGROUND OF THE INVENTION

An interest in water-borne coatings and printing formulations has been increased by regulatory and environmental concerns. In order to reduce or eliminate organic solvents from formulations, the solvents used should be replaced partially or completely with water from coating formulations to obtain the low volatile organic carbon (VOC) content. The possible methods of eliminating or minimizing organic solvents in coating and printing formulations include the following:

1. The coating and printing systems employ a polymer solution as a binder in a mixed organic and aqueous solvent. This method only partially eliminates the need for organic solvents.
2. The coatings and printing ink systems employ an aqueous polymer solution as a binder. This method is limited to water-soluble polymers and fails to provide water-resistance to the finished products. In addition, a large amount of water needs to be removed, which limits its use in some applications such as printing where the printing press speed must be reduced due to slow drying of inks on substrates.
3. The coating and printing systems employ an aqueous solution of alkali salts (e.g., sodium, potassium, ammonium, etc.) of polymers used as a binder. Acrylic-based polymers are widely used in formulating water-based inks and coatings. If ammonium salt of acrylic polymer is used, the change in pH of the product due to escape of ammonia creates several problems in the printing process as well affects end-use properties of the coatings and printing films.
4. The printing and coating systems employ a blend of the polymers as a binder. In general, the properties of printed ink/coating films are significantly improved as compared to a system without the polymer blends.

U.S. Pat. Nos. 4,704,309, 4,738,785, 4,883,714 and 4,847,316 relate to an aqueous ink composition containing water-dispersible polyester. The aqueous inks containing such a polymeric material have many desirable properties such as good adhesion to a variety of substrates and a wide viscosity range. However, despite the advantages obtained using such a polymeric material in aqueous inks, it is known that aqueous inks with such a polymer by itself have been alleged to have problems like poor water resistance and poor block resistance on certain substrates.

U.S. Pat. No. 4,623,680 teaches a method of preparing polymer blends from ammonium or amine salt of a carboxyl functional acrylic copolymer mixed with phenolplast resins useful as can coating compositions. The polyepoxide resins partially reacted with a monofunctional acid group and, optionally, an epoxidized hydrocarbon or vegetable oil.

U.S. Pat. No. 4,395,500 by Gernot et al. discloses a method of preparing polymer blend of styrene and esters of acrylic or methacrylic acid. The aqueous resin solution provides a bimodel particle size distribution with 10 weight % of particles having an average diameter of less than 0.2 μm and of 90 weight % of particles having an average diameter of more than 0.25 μm. The ratio of average grain size of coarse to fine polymer is at least 2:1.

These resin dispersions are claimed to be suitable especially as binder in plasters and gloss paints.

U.S. Pat. No. 4,921,899 discloses an ink composition containing a blend of a polyester, an acrylic polymer and a vinyl polymer. The water-based inks containing the blend of these polymers as a binder are taught to be able to significantly improve ink film properties such as alcohol resistance, block resistance and water resistance as compared to water-dispersible polyester alone. The polymer blends were also employed to prepare ink primers and overprint varnishes. However, these polymer blends were prepared by mixing an aqueous polyester dispersion with an acrylic emulsion which contains surfactants and other additives. The presence of surfactants in the ink formulations creates several problems related to ink stability, printing process and print quality of the ink film.

U.S. patent application No. 225,520 relates to an ink composition containing a blend of a polyester and an acrylic polymer. It was observed that the water-dispersible polyester material, when mixed with an acrylic polymer, can provide good water resistance and good block resistance without sacrifice of the advantages of water-dispersible polyester alone. This polymer blend was used to formulate water-based inks, overprints, and ink primers. As with U.S. Pat. No. 4,921,899, the polyester/acrylic blends were prepared by mixing polyester dispersions with acrylic emulsions containing surfactants and other additives.

In order to avoid prior art problems and uncertainty of ink performance, it would be desirable to have a process for preparing water dispersible blends of polyesters and acrylic polymer that avoids the need for surfactants.

SUMMARY OF THE INVENTION

The process of the present invention for preparing polyester/acrylic blends can be practiced without the need for surfactants. In particular, it has been found that polyesters containing at least 12 mol % of a difunctional sulfomonomer can be employed in the process of the invention with compatible acrylic polymers while polyesters with less than 12 mol % of said sulfomonomers result in unstable aqueous dispersions. The aqueous polymer blends of the present invention can be useful for formulating water-based formulations like inks, overprint varnishes, ink primers, paint, and coatings for a variety of applications. The aqueous polymer blends are water-dispersible.

The process of the present invention comprises the steps of:

(A) contacting substantially dry acrylic polymer with a solubilizing amount of an alkaline solution comprising an amine or ammonium compound dissolved in water so as to achieve an acrylic polymer solution having a pH of at least about 10, (B) heating the acrylic polymer solution formed by step (A) at a sufficient temperature to result in an acrylic polymer solution having a pH of less than about 9, (C) contacting the acrylic polymer solution formed by step (B) with a water dispersible polyester material having carbonyloxy linking groups in the linear molecular structure wherein up to 80% of the linking groups may be carboxylamido linking groups, the polymer having an inherent viscosity of from about 0.1 to about 0.5 measured in a 60/40 parts by weight solution of phenol/tetrachloroethane at 25° C. and at a concentration of 0.25 grams of polymer in 100 mL of the solvent, the polymer containing substantially equimolar proportions of acid equivalents (100 mol %) to hydroxy and amino equivalents (100 mol %), the polymer comprising the reaction products of (a), (b), (c) and (d) from the following components or ester forming or esteramide forming derivatives thereof:

(a) at least one difunctional dicarboxylic acid;
(b) from about 12 to about 25 mol %, based on a total of all acid, hydroxyl and amino equivalents being equal to 200 mol %, of at least one difunctional sulfomonomer containing at least one metal cationic group attached to aromatic nucleus wherein the functional groups are hydroxy, carboxyl, or amino;
(c) at least one difunctional reactant selected from a glycol or a mixture of a glycol and diamine having two —NRH groups, the glycol containing two —CH$_2$—OH groups; and
(d) from none to at least one difunctional reactant selected from a hydroxycarboxylic acid having one —CR$_2$—OH group, an aminocarboxylic acid having one —NHR group, and an amino-alcohol having one —CH$_2$—OH group and one —NHR group, or mixtures of said difunctional reactants, wherein each R is an H atom or an alkyl group of 1 to 4 carbon atoms, said contacting occurring under agitation and at a sufficient temperature of about 80° C. to about 99° C. to result in a polymer blend wherein the polyester is substantially completely dispersed in the acrylic polymer solution, and the weight ratio of acrylic polymer:polyester is about 1:99 to about 50:50, (D) cooling the polymer blend composition of step (C) to a temperature range of about 45° C. to less than about 80° C., wherein a C$_1$-C$_4$ alcohol or a mixture of a C$_1$-C$_4$ alcohol and propylene glycol is added at a concentration of about 2 to about 10% of the ultimate total polymer blend composition, (E) further cooling the polymer blend composition of step (C) to less than about 45° C., wherein the acrylic polymer is compatible with the polyester.

DETAILED DESCRIPTION OF THE INVENTION

As used herein, the terms "water-dispersible polyester", "water-dispersible polyester material", "polyester" or "polyester material" refer to the polyesters defined in step (C) above. Whenever the term "water-dispersible" or "water-dissipatable" is used herein, it will be understood to refer to the activity of a water or aqueous solution on the applicable polymer. The term is specifically intended to cover those situations wherein the solution dissolves and/or disperses the polymer material therein and/or therethrough.

The polyester and the acrylic polymer useful in the process of the present invention are compatible with each other. By the term "compatible" is meant that a 60/40 weight blend of acrylic polymer/polyester (a blend with less acrylic polymer) at a 25% solids content in water will not gel or have a significant increase in viscosity after being held at 120° F. (48.89° C.) for 24 hours. By the term "gel" is meant that the blend is not pourable at room temperature. A significant increase in viscosity after 24 hours at 48.89° C. is typically at least two or three times the viscosity at zero time.

In the process of the invention it is preferred that the temperature for step (B) is about 70° C. to about 95° C.

It is more preferred wherein the temperature for step (A) is about 18° C. to about 50° C., the temperature for step (B) is about 90° C. to about 95° C., the temperature for step (C) is about 85° C. to about 95° C., the temperature for step (E) is about 15° C. to about 25° C., and the pH of the acrylic polymer solution for step (A) is about 10 to about 11.

It is also preferred that the weight ratio of acrylic polymer:polyester is about 1:99 to about 40:60 and the Brookfield viscosity of the polymer blend composition formed by step (E) is about 30 cp to about 1,000 cp as measured at 30 rpm. Brookfield viscosity can be determined according to ASTM Procedure D2196.

It is more preferred that the weight ratio of acrylic polymer:polyester is about 10:90 to about 35:65 and the Brookfield viscosity of the polymer blend composition formed by step (E) is about 50 cp to about 500 cp as measured at 30 rpm.

Regarding step (D) it is preferred that about 4 to about 8% of a C$_1$-C$_4$ alcohol is added or a mixture of about 4 to about 8% of a C$_1$-C$_4$ alcohol and about 1 to about 5% of propylene glycol is added, said percentages being based on the total weight of the polymer blend composition. More preferred is wherein about 2 to about 4% of propylene glycol is added. Preferred C$_1$-C$_4$ alcohols include n-propanol, isopropanol, ethanol, and the like.

The polyesters of the invention are water-dispersible as a result of sulfonate groups on the polyester backbone. Suitable compositions are those described in U.S. Pat. No. 3,734,874, 3,546,008, 4,335,220 and 3,779,993, incorporated herein by reference. Basically, these polyesters and polyesteramides are described as having carbonyloxy interconnecting groups in the linear molecular structure wherein up to 80% thereof may be carbonylamido linking groups, the polymer having an inherent viscosity of at least about 0.1. It has been discovered that polyesters containing less than 12 mol % of a difunctional sulfomonomer will not function properly in the present invention in that acrylic blends made therefrom will not be stable. Thus, 12 to about 25 mol % of said sulfomonomer is typically employed with 15–25 mol % being preferred and 17–20 mol % being more preferred.

The inherent viscosities (I.V.) of the particular polyester materials useful herein typically range from about 0.1 to about 1.0 determined according to ASTM D2857-70 procedure, in a Wagner Viscometer of Lab Glass, Inc. of Vineland, New Jersey, having a ¼ mL capillary bulb, using a polymer concentration about 0.25% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation $$(\eta) _{0.50\%}^{25° C.} = \frac{\ln \frac{t_s}{t_o}}{C}$$

where:

($\eta$)=inherent viscosity at 25° C. at a polymer concentration of 0.25 g/100 mL of solvent;
ln=natural logarithm;
$t_s$=sample flow time;
$t_o$=solvent-blank flow time; and
C=concentration of polymer in grams per 100 mL of solvent=0.25.

The units of the inherent viscosity throughout this application are in deciliters/gram. It is noted that higher concentrations of polymer, e.g., 0.50 g of polymer/100 mL solvent may be employed for more precise I.V. determinations.

The dicarboxylic acid component of the polyester comprises aliphatic dicarboxylic acids, alicyclic dicarboxylic acids, aromatic dicarboxylic acids, or mixtures of two or more of these acids. Examples of such dicarboxylic acids include succinic; glutaric; adipic; azelaic; sebacic; itaconic; 1,4-cyclohexanedicarboxylic; phthalic; terephthalic and isophthalic.

It should be understood that use of the corresponding acid anhydrides, esters, and acid chlorides of these acids is included in the term "dicarboxylic acid."

Other suitable acids are disclosed in U.S. Pat. No. 3,779,993.

The difunctional sulfo-monomer component of the polyester may advantageously be a dicarboxylic acid or an ester thereof containing a metal sulfonate group or a glycol containing a metal sulfonate group or a hydroxy acid containing metal sulfonate group. The metal ion of the sulfonate salt may be $Na^+$, $Li^+$, $K^+$ and the like. The resulting polyesters or polyesteramides are less readily dissipated by cold water and more readily dissipated by hot water. It is possible to prepare the polyester or polyesteramide using, for example, a sodium sulfonate salt and later by ion-exchange replace this ion with a different ion, and thus alter the characteristics of the polymer. The difunctional monomer component may also be referred to as a difunctional sulfomonomer and is further described hereinbelow.

Advantageous difunctional sulfo-monomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters; metallosulfoaryl sulfonate as described in U.S. Pat. No. 3,779,993.

Particularly superior results are achieved when the difunctional sulfo-monomer component is 5-sodiosulfoisophthalic acid or its esters and the glycol is a mixture of ethylene glycol or 1,4-cyclohexanedimethanol with diethylene glycol.

When the sulfonate-containing difunctional monomer is an acid or its ester, the polyester should contain at least 8 mol % of said monomer based on total acid content. Total acid content is calculated as the sum of (1) moles of component (a) namely dicarboxylic acids, (2) one-half of the moles of carboxyl-containing compounds of component (d), (3) moles of component (c) which are dicarboxylic acids, and (4) one-half of the moles of component (c) which are monocarboxy-containing compounds.

Adequate water-dispersible polyesters can be prepared without any poly(ethylene glycol) such as those described in U.S. Pat. No. 4,340,519, incorporated herein by reference in its entirety. Nevertheless, in a preferred form of the present invention, at least part of the glycol component, preferably at least 10 mol %, contains repeating units of a poly(ethylene glycol) of the formula

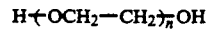

wherein n is an integer of 1 to 4, preferably 2 to 4.

Other useful glycols for preparing copolyesters may consist of aliphatic, alicyclic, and aralkyl glycols. Examples of these glycols include ethylene glycol; propylene glycol; 1,3-propanediol; 2,4-dimethyl-2-ethyhexane-1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol.

More preferably, the polyester comprises an acid component of from about 75 to about 84 mol % isophthalic acid and conversely from about 25 to about 16 mol % 5-sodiosulfoisophthalic acid, and a glycol component of from about 45 to about 60 mol % diethylene glycol and conversely from about 55 to about 40 mol % 1,4-cyclohexanedimethanol or ethylene glycol. More preferably, the inherent viscosity of the polyester is from about 0.28 to about 0.35, the said acid component comprises from about 80 to about 83 mol % isophthalic acid and conversely from about 20 to about 17 mol % 5-sodiosulfoisophthalic acid, and the said glycol component comprises from about 52 to about 56 mol % diethylene glycol and conversely from about 48 to about 44 mol % 1,4-cyclohexanedimethanol.

Some polyesters useful in the present invention are commercially available, for example, Eastek-1100 ®, available from Eastman Chemical Products, Inc., Kingsport, Tenn. 37662, U.S.A.

The acrylic polymer useful in the present invention preferably comprises repeating units of the formula

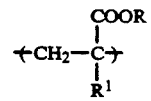

where R is H, a straight, branched, or cyclic alkyl group of 1 to 20 carbon atoms optionally substituted with up to 2 substituents selected from $C_1$–$C_6$ alkoxy and halogen and $R^1$ is H or methyl.

It is preferred that R is a straight, branched, or cyclic alkyl group of 1 to 10 carbon atoms optionally substituted with up to 2 substituents selected from $C_1$–$C_6$ alkoxy, chloro and bromo.

It is more preferred that R is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl.

It is preferred that the molecular weight of the acrylic polymer is about 5,000 to about 50,000, more preferably about 5,000 to about 25,000 and most preferably about 5,000 to about 20,000.

Also preferred is wherein the acrylic polymer has an acid number of about 100 to about 250, and a glass transition temperature of greater than about 0° C. More preferred is wherein said acrylic polymer has an acid number of about 150 to about 210 and wherein said acrylic polymer further contains styrene repeating units, acrylonitrile repeating units, or a mixture thereof.

Useful acrylic polymers that can be employed in the preparation of polymer blends according to the process of the present invention are commercially available by tradename "Joncryl" from S. C. Johnson and Sons, Inc., Racine, Wis. 43403, U.S.A., and "Vancryl" from Vantage.

For step (A) of the process of the invention it is preferred that the amine moiety or ammonium moiety is present in an amount of about 0.02 to about 3.0 weight %, based on the total weight of the polymer blend.

Examples of amine or ammonium compounds included are a mixture of compounds such as ammonium hydroxide, methyl amine, methyl ethyl amine, and the like.

In the process of the invention it is preferred that the polymer blend composition produced by step (E) contains about 5 to about 50 weight % solids; and the dry polymer blend has an I.V. of about 0.05 to about 0.30 as determined by ASTM Method D2857.70, an acid number of about 20 to about 100 and a Tg as measured by DSC of about 20° C. to about 120° C. More preferred is wherein the polymer blend composition produced by step (E) contains about 15 to about 40 weight % solids; and the polymer blend has an I.V. of about 0.1 to about 0.2, an acid number of about 35 to about 80, and a Tg of about 25° C. to about 100° C.

The present invention will be illustrated by the following examples which should not be construed as a limitation upon the scope of the invention.

Polyesters used in the examples are as follows:

| Polyester Designation | IPA, Mol % | SIP, Mol % | DEG, Mol % | CHDM, Mol % | I.V. | Tg |
|---|---|---|---|---|---|---|
| A | 89 | 11 | 100 | 0 | .42 | 29 |
| B | 89 | 11 | 78 | 22 | .36 | 38 |
| C | 82 | 18 | 34 | 46 | .33 | 55 |

Where
IPA = isophthalic acid
SIP = 5-sodiosulfoisophthalic acid
DEG = diethylene glycol
CHDM = 1,4-cyclohexanedimethanol
I.V. = inherent viscosity Polyester C is a polyester useful in the process of the invention and Polyesters A and B are comparative polyesters.

Joncryl-678 ® polymer is available from Johnson Wax and is an acrylic polymer having a molecular weight of 8,000, an acid number of 200, and a Tg of 85° C. Joncryl 67 ® is also available from Johnson Wax, and it is an acrylic polymer having a molecular weight of 10,000, an acid number of 190, and a Tg of 70° C.

EXAMPLE 1

This example illustrates the preparation of polymer blends of a polyester and an acrylic polymer. The polymer blends are prepared employing the following ingredients:

| Ingredients | Amount (g) | (%) |
|---|---|---|
| Polyester C Pellets | 240.0 | 21.43 |
| Joncryl-678 ® Polymer Flakes | 100.0 | 8.93 |
| Isopropyl Alcohol | 100.0 | 8.93 |

-continued

| Ingredients | Amount (g) | (%) |
|---|---|---|
| Ammonium Hydroxide (28% Solution) | 30.0 | 2.68 |
| Propylene Glycol | 20.0 | 1.78 |
| Water | 630.0 | 56.25 |

The following procedure is used for preparing aqueous polymer blend:
1. Add NH₄OH to water. After complete mixing, Joncryl-678 ® polymer flakes are added to alkaline solution during continuous stirring the mixture.
2. The polymer solution is heated to 90° C. while continuous stirring in order to remove excess ammonia from the solution.
3. During stirring at 90° C., Polyester C polymer pellets are added to the Joncryl-678 ® polymer solution. The stirring is continued to disperse Polyester C pellets.
4. After complete mixing, the polymer blend is allowed to cool. At 60° C., isopropanol and propylene glycol are added during stirring. The stirring is continued until the polymer blend temperature becomes 25° C. The polymer blend obtained is stable and phase separation does not occur even after 6 month storage at an ambient temperature.

EXAMPLE 2

Example 1 is repeated with the exception that normal propyl alcohol is used instead of isopropyl alcohol. The ingredients used to prepare aqueous polymer blend are as follows:

| Ingredients | Amount (g) | (%) |
|---|---|---|
| Polyester C Pellets | 400.0 | 18.22 |
| Joncryl-678 ® Polymer Flakes | 200.0 | 9.11 |
| Normal Propyl Alcohol | 210.0 | 9.56 |
| Ammonium Hydroxide (28% Solution) | 60.0 | 2.73 |
| Propylene Glycol | 25.0 | 1.15 |
| Water | 1300.0 | 59.23 |

The non-volatile content in the polymer blend is 29.0 weight %. The inherent viscosity (I.V.) of the blend is 0.149. The polymer blends remain stable for a 6 month period.

EXAMPLE 3

Example 2 is repeated with the exception that the volume of the batch is increased to about twice to scale up the process. The ingredients employed are as follows:

| Ingredients | Amount (g) | (%) |
|---|---|---|
| Polyester C Pellets | 800.0 | 17.82 |
| Joncryl-678 ® Polymer Flakes | 400.0 | 8.91 |
| Normal Propyl Alcohol | 490.0 | 10.91 |
| Ammonium Hydroxide (28% Solution) | 120.0 | 2.67 |
| Propylene Glycol | 60.0 | 1.34 |
| Water | 2620.0 | 58.35 |

The non-volatile content in the polymer blend is 28.5 weight %. The polymer blend is analyzed for n-propanol content by gas chromatography. The n-propanol content is 9.88 weight %. The I.V. of the polymer blend is 0.127. The blends are stable and do not separate in two distinct phases on storage.

EXAMPLE 4

Example 1 is repeated with the exception that ethylene glycol is used instead of propylene glycol. The Joncryl-678 ® polymer solution is made in the concentrated alkaline solution and diluted to the desired composition with water after Joncryl-678 ® flakes are dissolved completely. The ingredients used are as follows:

| Ingredients | Amount | |
|---|---|---|
| | (g) | (%) |
| Polyester C Pellets | 100.0 | 19.05 |
| Joncryl-678 ® Polymer Flakes | 50.0 | 9.53 |
| Isopropyl Alcohol | 50.0 | 9.52 |
| NH$_4$OH (28% Aqueous Solution) | 15.0 | 2.86 |
| Ethylene Glycol | 10.0 | 1.90 |
| Water | 300.0 | 57.14 |

The non-volatile content in the polymer blend is 30.8 weight %. The I.V. of the polymer blend is 0.129. The blends are stable.

EXAMPLE 5

Example 1 is repeated with the exception that the Polyester C/Joncryl-678 ® polymer ratio used is 9/1 instead of 2.4/1. The ingredients employed to prepare neat aqueous polymer blends are as follows:

| Ingredients | Amount | |
|---|---|---|
| | (g) | (%) |
| Polyester C Pellets | 135.0 | 27.84 |
| Joncryl-678 ® Polymer Flakes | 15.0 | 3.09 |
| Isopropyl Alcohol | 50.0 | 10.31 |
| NH$_4$OH (28% Aqueous Solution) | 5.0 | 1.03 |
| Water | 280.0 | 57.73 |

The non-volatile content in the blend is 31.0 weight %. The measured isopropyl alcohol content is 9.66 weight %. The I.V. of the polymer blend is 0.260 and Tg is 50.74° C. The polymer blends are stable.

EXAMPLE 6

Example 5 is repeated with the exception that the Polyester C/Joncryl-678 ® polymer ratio used was 4/1 instead of 9/1. The ingredients employed are as follows:

| Ingredients | Amount | |
|---|---|---|
| | (g) | (%) |
| Polyester C Pellets | 120.0 | 24.49 |
| Joncryl-678 ® Polymer Flakes | 30.0 | 6.12 |
| Isopropyl Alcohol | 50.0 | 10.20 |
| NH$_4$OH (28% Aqueous Solution) | 10.0 | 2.04 |
| Water | 280.0 | 57.15 |

The polymer blend prepared according to the process of this invention contains 31.2 weight % non-volatile content. The measured isopropanol content is 9.72 weight %. The I.V. of the polymer blend is 0.214 and the Tg is 48.39° C. The polymer blends are stable for several months.

EXAMPLE 7

Example 6 is repeated with the exception that the Polyester C/Joncryl-678 ® polymer ratio used is 7/3 instead of 4/1 in preparing polymer blends. The ingredients employed are as follows:

| Ingredients | Amount | |
|---|---|---|
| | (g) | (%) |
| Polyester C Pellets | 105.0 | 21.21 |
| Joncryl-678 ® Polymer Flakes | 45.0 | 9.09 |
| Isopropyl Alcohol | 50.0 | 10.10 |
| NH$_4$OH (28% Aqueous Solution) | 15.0 | 3.03 |
| Water | 280.0 | 56.57 |

The polymer blend contains 31.0 weight % non-volatile material and 8.72 weight % isopropyl alcohol as measured experimentally. The I.V. of the blend is 0.177, while Tg is 49.04° C. The blends remain stable for several months.

EXAMPLE 8

Example 7 is repeated with the exception that the Polyester C/Joncryl-678 ® polymer ratio used to prepare polymer blend is 3/2 instead of 7/3. The amount of ingredients employed is as follows:

| Ingredients | Amount | |
|---|---|---|
| | (g) | (%) |
| Polyester C Pellets | 90.0 | 18.18 |
| Joncryl-678 ® Polymer Flakes | 60.0 | 12.12 |
| Isopropyl Alcohol | 50.0 | 10.10 |
| NH$_4$OH (28% Aqueous Solution) | 15.0 | 3.03 |
| Water | 280.0 | 56.57 |

The non-volatile content in the polymer blend is 31.35 weight %. The I.V. and Tg of the blends are 0.160 and 47.23° C. respectively. The polymer blend separates in two distinct phases in a few hours. The polymer blends are diluted to 25% solid content by water. These diluted blends remain stable for several months.

EXAMPLE 9

Example 1 is repeated with the exception that the Polyester C/Joncryl-678 ® polymer ratio used is 50/50 instead of 24/10. The amount of ingredients employed is as follows:

| Ingredients | Amount | |
|---|---|---|
| | (g) | (%) |
| Polyester C Pellets | 75.0 | 12.42 |
| Joncryl-678 ® Polymer Flakes | 75.0 | 12.42 |
| Isopropyl Alcohol | 50.0 | 8.28 |
| Propylene Glycol | 10.0 | 1.65 |
| NH$_4$OH (28% Aqueous Solution) | 19.0 | 3.14 |
| Water | 375.0 | 62.09 |

The non-volatile content is 26.4 weight %. The I.V. of the blend is 0.118. The polymer blends separate into two distinct phases in a few weeks. However, the blends diluted to 25.0 weight % solid remain stable for several months.

EXAMPLE 10

Example 1 is repeated with the exception that Joncryl-67 ® polymer (mol. wt. 10,000) is used instead of Joncryl-678 ® polymer (mol. wt. 8,000). The following ingredients are employed to prepare the polymer blend:

| Ingredients | Amount (g) | (%) |
|---|---|---|
| Polyester C Pellets | 450.0 | 20.7 |
| Joncryl-67 ® Polymer Flakes | 150.0 | 6.9 |
| Normal Propanol | 200.0 | 9.2 |
| Propylene Glycol | 40.0 | 1.8 |
| NH₄OH (28% Aqueous Solution) | 36.0 | 1.7 |
| Water | 1300.0 | 59.7 |

The stable polymer blends are obtained which have the following properties:

| % Solids | 29.76 |
|---|---|
| Viscosity, cps | 34.1 |
| Acid Number | 59.83 |
| I.V. | 0.124 |
| Tg °C. | 54.84 |
| % n-PrOH | 8.79 |

EXAMPLE 11 (Comparative)

Example 10 is repeated with the exception that Polyester B polymer pellets are used instead of Polyester C in preparing neat polymer blends in accordance with the process described in Example 1. The ingredients employed for preparing aqueous polymer blends are as follows:

| Ingredients | Amount (g) | (%) |
|---|---|---|
| Polyester B Pellets | 112.5 | 20.7 |
| Joncryl-67 ® Polymer Flakes | 37.5 | 6.9 |
| Normal Propanol | 50.0 | 9.2 |
| Propylene Glycol | 10.0 | 1.8 |
| NH₄OH (28% Aqueous Solution) | 9.0 | 1.7 |
| Water | 325.0 | 59.7 |

The polymer blends are not stable and separate into two distinct phases at room temperature.

EXAMPLE 12 (Comparative)

Example 11 is repeated with the exception that Polyester A pellets are used instead of Polyester B pellets in preparing neat polymer blends in an aqueous medium using the process of the invention as described in Example 1. The ingredients employed are as follows:

| Ingredients | Amount (g) | (%) |
|---|---|---|
| Polyester A Pellets | 112.5 | 20.7 |
| Joncryl-67 ® Polymer Flakes | 37.5 | 6.9 |
| Normal Propanol | 50.0 | 9.2 |
| Propylene Glycol | 10.0 | 1.8 |
| NH₄OH (28% Aqueous Solution) | 9.0 | 1.7 |
| Water | 325.0 | 59.7 |

The polymer blends are not stable and separate into two distinct phases at room temperature.

EXAMPLE 13

This example illustrates the storage stability of polymer blends containing Polyester C/Joncryl 67 ® polymer or Polyester C/Joncryl-678 ® polymer ratio of 70/30 at 0° C., 50° C. and an ambient temperature. Results indicate that aqueous polymer blends are stable. A gradual increase in viscosity is observed, while pH almost remains the same during a storage period of several weeks at 0° C., 50° C. and an ambient temperature.

EXAMPLE 14

This example illustrates the use of polymer blend in formulating water-based inks with improved properties such as block resistance, water resistance, gloss, lay and adhesion on various substrates. The polymer blends prepared in accordance with Example 7 are used for formulating water-based inks. The ink drawdowns are made on coated papers and foil.

The water resistance of the ink film containing polymer blend as a binder is improved as compared to ink containing only Polyester C. For inks containing polymer blend blocking temperature is about 150° F. (65.56° C.) as compared to 110° F. (43.33° C.) for inks containing Polyester C binder alone.

EXAMPLE 15

Example 14 is repeated with the exception that polymer blends containing Polyester C/Joncryl-678 ® polymer ratio 80/20 is used as a binder in formulating water-based inks instead of 70/30 ratio of the blend. The ink film properties are improved significantly compared to Polyester C binder alone.

The invention has been described in detail with particular reference to preferred embodiments thereof, but it will be understood that variations and modifications can be effected within the spirit and scope of the invention.

I claim:

1. A process comprising the steps of:
    (A) contacting substantially dry acrylic polymer with a solubilizing amount of an alkaline solution comprising an amine or ammonium compound dissolved in water so as to achieve an acrylic polymer solution having a pH of at least about 10,
    (B) heating the acrylic polymer solution formed by step (A) at a sufficient temperature to result in an acrylic polymer solution having a pH of less than about 9,
    (C) contacting the acrylic polymer solution formed by step (B) with a water dispersible polyester material having carbonyloxy linking groups in the linear molecular structure wherein up to 80% of the linking groups may be carboxylamido linking groups, said water-dispersible polyester material having an inherent viscosity of from about 0.1 to about 0.5 measured in a 60/40 parts by weight solution of phenol/tetrachloroethane at 25° C. and at a concentration of 0.25 grams of polymer in 100 mL of the solvent, said water-dispersible polyester material containing substantially equimolar proportions of acid equivalents (100 mol %) to hydroxy and amino equivalents (100 mol %), the polymer comprising the reaction products of (a), (b), (c) and (d) from the following components or ester forming or ester-amide forming derivatives thereof:
    (a) at least one dicarboxylic acid;
    (b) from about 12 to about 25 mol %, based on a total of all acid, hydroxyl and amino equivalents being equal to 200 mol %, of at least one difunctional sulfomonomer containing at least one metal cationic group attached to aromatic nucleus wherein the functional groups are hydroxy, carboxyl, or amino;

(c) at least one difunctional reactant selected from a glycol or a mixture of a glycol and diamine having two —NRH groups, the glycol containing two —CH$_2$—OH groups; and (d) from none to at least one difunctional reactant selected from a hydroxycarboxylic acid having one —CR$_2$—OH group, an aminocarboxylic acid having one —NHR group, and an aminoalcohol having one —CH$_2$—OH group and one —NHR group, or mixtures of said difunctional reactants, wherein each R is an H atom or an alkyl group of 1 to 4 carbon atoms, said contacting occurring under agitation and at a sufficient temperature of about 80° C. to about 99° C. to result in a polymer blend wherein the polyester is substantially completely dispersed in the acrylic polymer solution, and the weight ratio of acrylic polymer:polyester is about 1:99 to about 50:50, (D) cooling the polymer blend composition of step (C) to a temperature range of about 45° C. to less than about 80° C., wherein a C$_1$-C$_4$ alcohol or a mixture of a C$_1$-C$_4$ alcohol and propylene glycol is added at a concentration of about 2 to about 10% of the total polymer blend composition, (E) further cooling the polymer blend composition of step (C) to less than about 45° C., wherein the acrylic polymer is compatible with the polyester.

2. The process of claim 1 wherein said difunctional reactant (c) of said polyester material contains at least 10 mol %, based on the total mol % of hydroxy or hydroxy and amino equivalents, of a poly(ethylene glycol) having the structural formula:

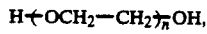

n being an integer of between 1 and about 4.

3. The process of claim 2 wherein about 4 to about 8% of a C$_1$-C$_4$ alcohol is added or a mixture of about 4 to about 8% of a C$_1$-C$_4$ alcohol and about 1 to about 5% of propylene glycol is added during step (D), said percentages being based on the total weight of the polymer blend composition.

4. The process of claim 3 wherein about 2 to about 4% of propylene glycol is added.

5. The process of claim 1 wherein the temperature for step (B) is about 70° C. to about 95° C.

6. The process of claim 1 wherein the temperature for step (A) is about 18° C. to about 50° C., the temperature for step (B) is about 90° C. to about 95° C., the temperature for step (C) is about 85° C. to about 95° C., the temperature for step (E) is about 15° C. to about 25° C., and the pH of the acrylic polymer solution for step (A) is about 10 to about 11.

7. The process of claim 1 wherein the molecular weight of the acrylic polymer is about 5,000 to about 50,000 and the amine or ammonium compound is ammonium hydroxide, methyl amine, methyl ethyl amine or a mixture thereof.

8. The process of claim 1 wherein the weight ratio of acrylic polymer:polyester is about 1:99 to about 40:60 and the Brookfield viscosity of the polymer blend composition formed by step (E) is about 30 cp to about 1,000 cp as measured at 30 rpm.

9. The process of claim 1 wherein the weight ratio of acrylic polymer:polyester is about 10:90 to about 35:65 and the Brookfield viscosity of the polymer blend composition formed by step (E) is about 50 cp to about 500 cp as measured at 30 rpm.

10. The process of claim 1 wherein the molecular weight of the acrylic polymer is about 5,000 to about 25,000 and said C$_1$-C$_4$ alcohol is n-propanol, isopropanol, or ethanol.

11. The process of claim 1 wherein the molecular weight of the acrylic polymer is about 5,000 to about 20,000 and the polyester comprises an acid component of from about 75 to about 84 mol % isophthalic acid and from about 25 to about 16 mol % 5-sodiosulfoisophthalic acid, and a glycol component of from about 45 to about 60 mol % diethylene glycol and from about 55 to about 40 mol % 1,4-cyclohexanedimethanol or ethylene glycol.

12. The process of claim 1 wherein the inherent viscosity of the polyester is from about 0.28 to about 0.35, the said acid component comprises from about 80 to about 83 mol % isophthalic acid and conversely from about 20 to about 17 mol % 5-sodiosulfoisophthalic acid, and the said glycol component comprises from about 52 to about 56 mol % diethylene glycol and from about 48 to about 44 mol % 1,4-cyclohexanedimethanol.

13. The process of claim 1 wherein the acrylic polymer has an acid number of about 100 to about 250, and a glass transition temperature of greater than about 0° C.

14. The process of claim 13 wherein said acrylic polymer has an acid number of about 150 to about 210 and wherein said acrylic polymer further contains styrene repeating units, acrylonitrile repeating units, or a mixture thereof.

15. The process of claim 1 wherein the polymer blend composition produced by step (E) contains about 5 to about 50 weight %, solids; and the dry polymer blend has an inherent viscosity of about 0.05 to about 0.30 as determined by ASTM Method D2857-70, an acid number of about 20 to about 100 and a Tg as measured by DSC of about 20° C. to about 120° C.

16. The process of claim 15 wherein the polymer blend composition produced by step (E) contains about 15 to about 40 weight % solids; and the polymer blend has an inherent viscosity of about 0.1 to about 0.2, an acid number of about 35 to about 80, and a Tg of about 25° C. to about 100° C.

17. The process of claim 1 wherein said acrylic polymer comprises repeating units of the formula

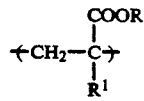

where R is H, a straight, branched, or cyclic alkyl group of 1 to 20 carbon atoms optionally substituted with up to 2 substituents selected from C$_1$-C$_6$ alkoxy and halogen and R$^1$ is H or methyl.

18. The process of claim 17 wherein R is a straight, branched, or cyclic alkyl group of 1 to 10 carbon atoms optionally substituted with up to 2 substituents selected from C$_1$-C$_6$ alkoxy, chloro and bromo.

19. The process of claim 17 wherein R is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl.

20. The process of claim 1 wherein the amount of amine moiety or ammonium moiety present in the polymer blend after step (E) is about 0.02 to about 3.0 weight %, based on the total weight of the polymer blend.

* * * * *